US007899240B2

(12) United States Patent
Ekstrand et al.

(10) Patent No.: US 7,899,240 B2
(45) Date of Patent: Mar. 1, 2011

(54) VIDEO PATTERN THUMBNAILS AND METHOD

(75) Inventors: Simon Ekstrand, Ekgården (SE); Martin Kretz, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1117 days.

(21) Appl. No.: 11/556,780

(22) Filed: Nov. 6, 2006

(65) Prior Publication Data

US 2008/0123954 A1    May 29, 2008

Related U.S. Application Data

(63) Continuation-in-part of application No. 11/532,577, filed on Sep. 18, 2006.

(51) Int. Cl.
*G06K 9/00* (2006.01)
*G06K 9/36* (2006.01)
(52) U.S. Cl. .......................... 382/154; 382/284
(58) Field of Classification Search .................. 382/106, 382/154, 103, 284
See application file for complete search history.

(56) References Cited

U.S. PATENT DOCUMENTS

| 5,602,584 | A | * | 2/1997 | Mitsutake et al. ............... 348/47 |
| 5,987,164 | A | * | 11/1999 | Szeliski et al. ................ 382/154 |
| 6,434,265 | B1 | * | 8/2002 | Xiong et al. ................... 382/154 |
| 2003/0189588 | A1 | | 10/2003 | Girgensohn et al. | |
| 2006/0140500 | A1 | * | 6/2006 | Ozaki ........................... 382/254 |
| 2007/0237225 | A1 | * | 10/2007 | Luo et al. ................. 375/240.12 |

FOREIGN PATENT DOCUMENTS

WO        2006/092752        9/2006

OTHER PUBLICATIONS

International Search Report for corresponding Application No. PCT/IS2007/000683 mailed Jul. 17, 2007.

* cited by examiner

*Primary Examiner* — Vu Le
*Assistant Examiner* — Alex Liew
(74) *Attorney, Agent, or Firm* — Renner, Otto, Boisselle & Sklar, LLP (57) ABSTRACT

An electronic equipment and method for creating a composite image or video pattern thumbnail from portions of data extracted from given frames in a sequence of frames. The extracted portions of frame data vary according to the location of the given frame within the sequence, and the composite image is representative of the content of the media file.

20 Claims, 6 Drawing Sheets

VIDEO PATTERN THUMBNAILS AND METHOD

This application is a continuation-in-part of co-pending U.S. patent application Ser. No. 11/532,577, filed on Sep. 18, 2006.

TECHNICAL FIELD OF THE INVENTION

The present invention relates generally to video or image processing and electronic equipment, such as electronic equipment for engaging in voice communications.

BACKGROUND

The use of thumbnail images is common in the computer industry. Thumbnails generally are small graphical representations of the contents of a media file, such as an image file. By viewing the thumbnail, a user may be able to determine the content of the media file without opening the file. Conventional thumbnails, however, are less useful when used to depict the contents of a non-image file, such as a video file. A conventional thumbnail of a video file may be comprised of a single image representative of a frame from the video file. Because the video file may contain tens of thousands of frames or more, a representation of a single frame from the video sometimes is not useful for identifying the content of the media file.

SUMMARY

According to one embodiment, an electronic equipment with a control circuit having access to a media file, the media file comprising data for a sequence of frames wherein the data for each frame in the sequence of frames represents a corresponding image, each frame having a location relative to the other frames in the sequence of frames and a processor for extracting portions of data for each frame in the sequence to produce a composite image, the location of the portion extracted from each given frame varying among the frames.

According to one aspect, the portion extracted from each given frame varies based upon the location of the given frame within the sequence of frames.

According to another aspect, the composite image is comprised of the extracted portions of data arranged in a chronological order according to the location of the given frame within the sequence of frames.

According to another aspect, the extracted portions are columns of frame data.

According to another aspect, the data representing the composite image is comprised of the columns of frame data arranged in a chronological order according to the location of the given frame within the sequence of frames.

According to yet another aspect, the extracted portions are rows of frame data.

According to another aspect, the data representing the composite image is comprised of the rows of frame data arranged according to the location of the given frame within the sequence of frames.

According to still another aspect, the portion extracted from the frames varies based upon the location of the greatest changes in the corresponding images for sequential frames within the sequence of frames.

According to another aspect, the sequence of frames is comprised of more frames at locations in the media file where there are large changes in the corresponding images for sequential frames and fewer frames at locations in the media file where there are small data changes in the corresponding images for sequential frames.

According to still another aspect the composite image is comprised of portions of data extracted from areas of the media file where there are larger changes and smaller changes, wherein the portions extracted from the areas having larger changes are brighter than the portions extracted from the areas where there are smaller changes.

According to another aspect, the media file is frame-based media.

According to yet another aspect the media file is time-based media.

According to another embodiment, a method of creating an image having the steps of accessing a media file, the media file comprising data for a sequence of frames wherein the data represents a corresponding image, each frame having a location relative to the other frames in the sequence of frames and extracting portions of data from the frames in the sequence to produce a composite image, the location of the extracted portion from each given frame varying among the frames.

According to one aspect, the method the extracting step includes varying the extracted portion from each given frame based upon the location of the given frame within the sequence of frames.

According to another aspect, the method further includes the step of forming a composite image by arranging the extracted portions in a chronological order according to the location of the given frame within the sequence of frames.

According to still another aspect, the extracting step includes extracting columns of frame data.

According to another aspect, the method includes the step of arranging the columns of frame data in a chronological order according to the location of the given frame within the sequence of frames.

According to yet another aspect, the extracting step includes extracting rows of frame data.

According to another aspect, the method further includes the step of arranging the varying rows of frame data according to the location of the given frame within the sequence of frames.

According to another aspect, the extracting step includes extracting data from more frames at locations in the media file where there are large changes in the corresponding images for sequential frames and from less frames at locations in the media file where there are small changes in the corresponding image for sequential frames.

According to still another aspect, the method further includes the step of brightening those portions of the composite image formed from portions of data extracted from the locations in the media file having large changes.

According to another embodiment, a program stored on a machine readable medium which, when executed by a machine, provides for the creation of an image by accessing a media file, the media file comprising frame data for a sequence of frames and extracting varying portions of the frame data from each of the plurality of frames to produce a composite image comprised of the extracted portions of frame data from the sequence of frames.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments. It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF EMBODIMENTS

In the following description, with reference to the drawings, like reference numerals are used to refer to like elements throughout. It will be appreciated that the drawings are not necessarily to scale. In the present application, the invention is described primarily in the context of electronic equipment and specifically, a mobile telephone. It will be appreciated, however, that the invention is not intended to be limited to a mobile telephone and can be any type of electronic equipment. The term "electronic equipment" includes portable radio communication equipment. The term "portable radio communication equipment," which hereinafter is referred to as a "mobile radio terminal," includes all equipment such as mobile telephones, pagers, communicators, electronic organizers, personal digital assistants (PDAs), smartphones, portable communication apparatuses or the like.

Figure 1:
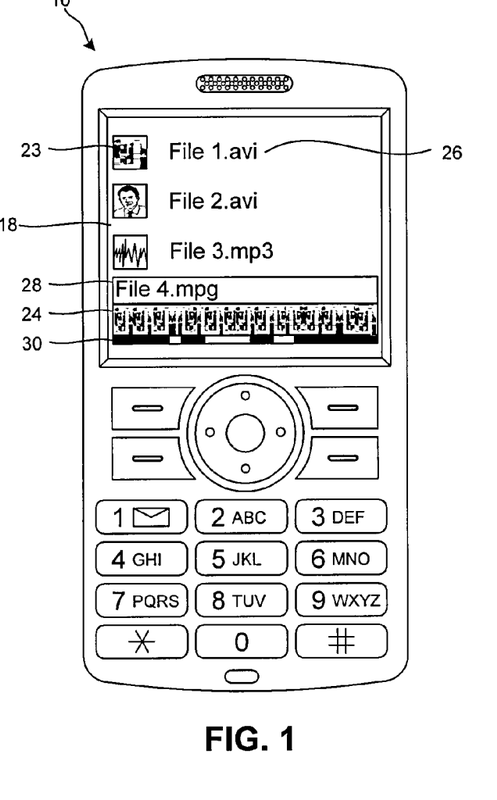
FIG. 1 is an electronic equipment displaying the contents of a media library on a display.

An electronic equipment 10 is shown in FIG. 1. The electronic equipment 10 is a mobile radio terminal and, in particular, a mobile telephone. Thus, the electronic equipment will be referred to as the mobile telephone 10.

Figure 9:
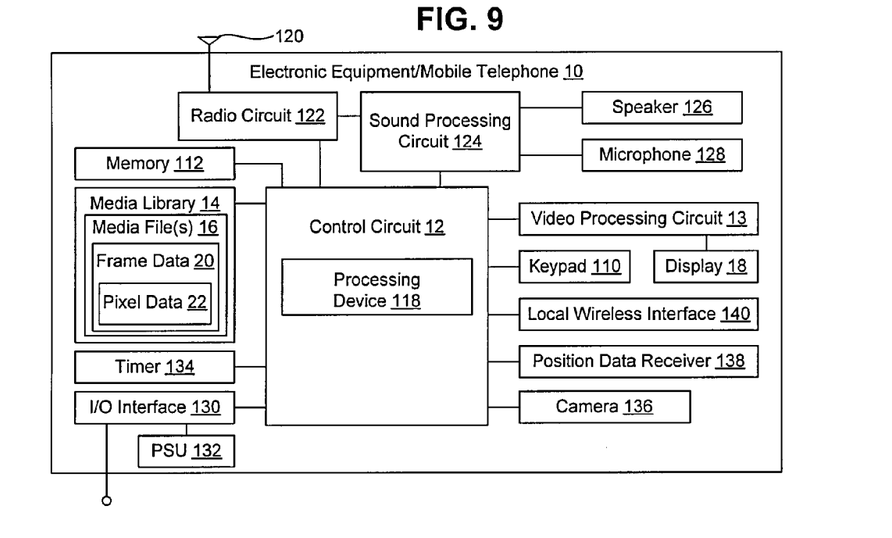
FIG. 9 is a schematic block diagram of the relevant portions of the mobile telephone of FIG. 8.

The functionality of the mobile telephone 10 will be described in more detail below. Referring briefly to FIG. 9, the mobile telephone 10 comprises a control circuit 12, a processor or video processing circuit 13 and access to a media library 14. The control circuit 12 is operable to control the video processing circuit 13 to play media files 16 on the display 18 of the mobile telephone 10.

Each media file 16 accessed in or stored by the media library 14 is programmed to include information about the media file, such as, for example, frame data 20 and information regarding the artist, title, format, etc. The media file 16 is comprised of frame data 20 representing a plurality of frames for displaying the media file 16 on the display 18. The frame data 20 is comprised of an array of pixel data 22 for each respective frame. The pixel data 22 is processed by the video processing circuit 13 to create a graphical representation of the frame on the display 18.

The video processing circuit 13 is operable to process the frame data 20 to create a video pattern thumbnail or composite image 24, which is comprised of a portion of the pixel data 22 for each of the plurality of frames in the media file 16. The composite image 24 therefore represents a unique representation of the content of the media file 16, such as the overall feel, colorization, light, tempo, etc., of the media file 16.

Referring again to FIG. 1, the contents of the media library 14 (or the files to which the media library 14 might have access) are shown in a menu on the display 18. The menu in FIG. 1 is an expandable/collapsible menu. In the collapsed state, the menu displays a thumbnail 23 and the title 26 of each media file 16. When the menu is expanded, the composite image 24, the title 28 of the media file 16 and a progress bar 30 are displayed. The progress bar 30 is a graphical depiction of the portions of the media file 16 that have been accessed, listened to, or played by the video processing circuit 13, for example, with a media player. With regard to the media file entitled "File 4.mpg", the color of the progress bar 30 has been changed by the video processing circuit 13 to indicate the portions of the file that have been accessed or played. The portions of the file that have not been played are colored white, while the portions of the file that have been played are colored black. The user can then easily determine which portions of the file have not been accessed and begin viewing the file at that point. If the media file 16 is an audio file, the progress bar 30 indicates which chapters or portions have been listened to and which have not, allowing a user to begin listening to the file where he or she previously stopped.

Although the display 18 of FIG. 1 depicts the thumbnail 23, the file name 28, composite image 24 and a progress bar 30 for each of the media files 16, in the collapsed and/or expanded state, it will be appreciated that the control circuit 12 may be programmed control the menu to display more, less, or different information, or to customize the menu as desired.

Figure 2:
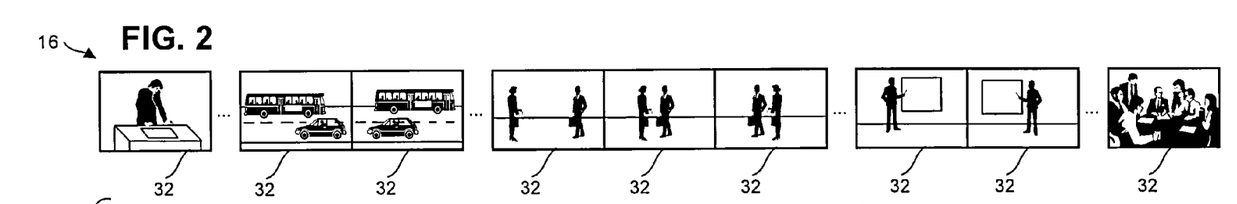
FIG. 2 is a series of frames representative of the content of a media file.

An example of a media file 16, such as a video file, is shown in FIG. 2. The media file 16 is comprised of a plurality of frames 32 arranged in chronological order. Each frame of the media file 16 is comprised of frame data 20 for displaying the frames 32 on the display 18. The frame data 20 is comprised of an array of pixel data 22, which is processed by the video processing circuit 13 to create a graphical representation of the frame 32 on the display 18.

The media files 16, especially video and audio files, may contain large amounts of data and may be compressed by various compression techniques that are well known in the art, including, for example, intraframe compression, interframe compression, lossless compression, etc. If the media file 16 has been compressed, the frame data 20 for each individual frame may not include a full set of pixel data 22 for representing an image or frame. In other words, the frame data 20 may contain only a portion of the data necessary for showing the frame on the display 18. When the compressed frame data is processed in conjunction with frame data 20 from the rest of the media file 16, however, a full image can be obtained. Thus, it will be appreciated by one of skill in the art that a full image may be obtained from the frame data 20 from any given frame if the frame data 20 is processed in conjunction with additional frame data 20 in the media file 16. The apparatus and processes described herein are equally applicable to both compressed and uncompressed media files, including video and image files, etc.

Figure 3:
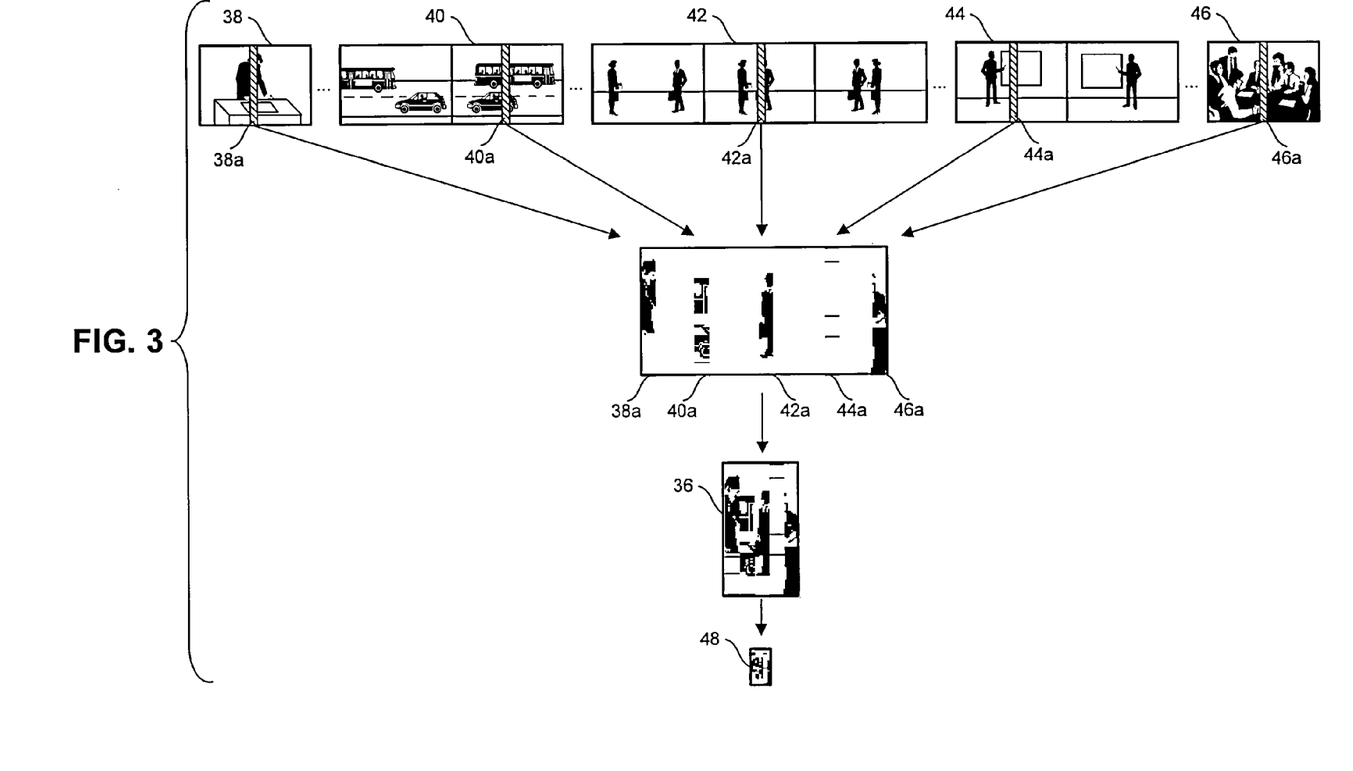
FIG. 3 is the series of frames of FIG. 2 used to create a composite image.

Referring to FIG. 3, the video processing circuit 13 is programmed to create the composite image 36 by extracting portions of pixel data 22 from the media file 16 of FIG. 2. In the embodiment of FIG. 3, a column of pixel data from each of the plurality of frames 38, 40, 42, 44, 46 in the video file 16 is extracted to create the composite image 36. For example, a column of pixel data 38*a* is extracted from frame 38. Likewise, a column of pixel data 40*a* is extracted from frame 40, etc., until columns of pixel data 38*a*, 40*a*, 42*a*, 44*a*, 46*a* are extracted from each of the plurality of frames 38, 40, 42, 44, 46. For purposes of illustration, the extracted portions of pixel data 38*a*, 40*a*, 42*a*, 44*a*, 46*a* are depicted as shaded regions in FIG. 3; however, it will be appreciated that the frame data 20 and the image represented by the frame data are not altered when the pixel data is extracted.

The video processing circuit 13 is also programmed to arrange the extracted portions 38*a*, 40*a*, 42*a*, 44*a*, 46*a* of the plurality of frames 38, 40, 42, 44, 46 side-by-side in chronological order to form the composite image 36. The composite image 36 may then be vertically compressed to create a reduced-size composite image 48, which may be used in the expandable/collapsible menu of FIG. 1.

Although only a few frames are shown in FIG. 3, the video processing circuit 13 is operable to extract pixel data 22 from any number of frames 32. For example, the plurality of frames 32 may be determined or based upon the total number of frames in the media file 16 or video file and the size of the display 18. For example, if the video file contains frame data 20 for 2400 frames and the display 18 is 240 pixels wide, then the video processing circuit 13 is programmed to extract pixel data from 240 even spaced frames, or in this example, every hundredth frame to create the composite image 36. Because the display is 240 pixels wide and data is extracted from 240 frames, one column of pixel data is extracted per frame and for assembling to create the composite image. Thus, the video processing circuit 13 is programmed to extract a single column of pixel data 22 from each of the 240 frames and combine the pixel data side-by-side in chronological order, as described above, to create the composite image 36.

Alternatively, the video processing circuit 13 may be programmed to extract pixel data from 120 frames rather than 240 frames, in which case two columns of pixel data would be extracted from each of the plurality of frames. Similarly, if the display is 480 pixels wide, the plurality of frames from which pixel data is extracted could be 480 frames, or the columns of pixel data could be 4 pixels wide, if data from 120 frames were extracted.

It will be appreciated that the values used above for the number of frames in the video file and the display size are only illustrative, and the video processing circuit 13 and the broad concepts described herein are applicable to media files having any number of frames and for displays of any size or resolution.

Generally, the center portion of each video frame in a video file contains the most relevant subject matter, i.e., it typically is the focus of the viewer's attention. The pixel data 22 for the upper, lower and side regions of the frame therefore is less likely to contain the most relevant subject matter. The video processing circuit 13 is programmed to extract the pixel data 22 from the center of the frames rather than the pixel data near the borders of the frames to increase the likelihood that the extracted portions of pixel data will contain relevant portions of the frames. As shown in FIG. 3, the extracted portions 38*a*, 40*a*, 42*a*, 44*a*, 46*a* of pixel data represent columns of frame data 20 from the center of each of the plurality of frames 38, 40, 42, 44, 46. The composite image 36 is therefore formed from pixel data 22 that is representative of columns of pixel data that are the most likely to contain relevant portions of the video file 16. The video processing circuit 13 also is operable to crop the upper and lower portions of each column of pixel data as well. Alternatively, the video processing circuit 13 may be programmed to compress the columns of pixel data to reduce the height of the composite image 36, thereby ensuring that the composite image is formed from the pixel data likely to contain the most relevant portions of the video file.

Figure 4:
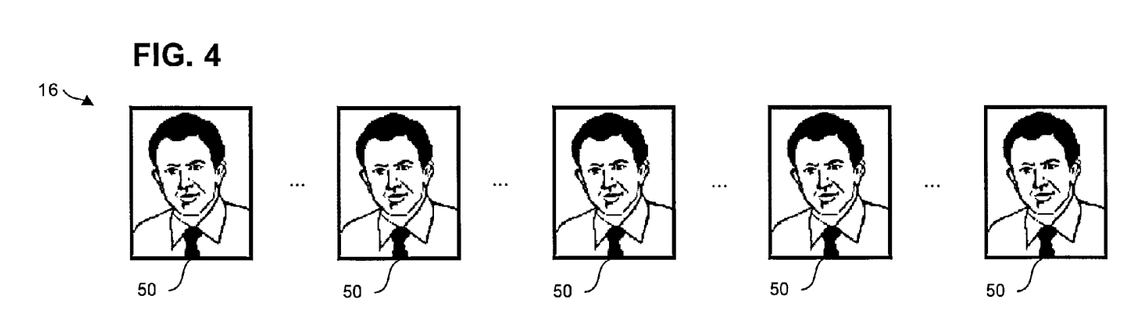
FIG. 4 is a series of frames representative of the content of a media file.

In another embodiment, shown in FIG. 4, the media file 16 contains a plurality of frames 50. The frame data for each of the frames may be representative of the same general subject matter. For example, as shown in FIG. 4, the media file 16 is a video file of a person's face, for example, if the person were giving a speech. Because the person's face does not substantially move throughout the video, the frame data for each of the plurality of frames 50 is generally the same, e.g., representative of the same general picture. Other examples of the media files could be a video of a generally stationary scene in nature, or a video having several different scenes where the frames comprising each of the scenes are generally representative of the same image, or another type of media file with generally similar subject matter throughout, etc., for each frame in the sequence of frames.

Figure 5A:
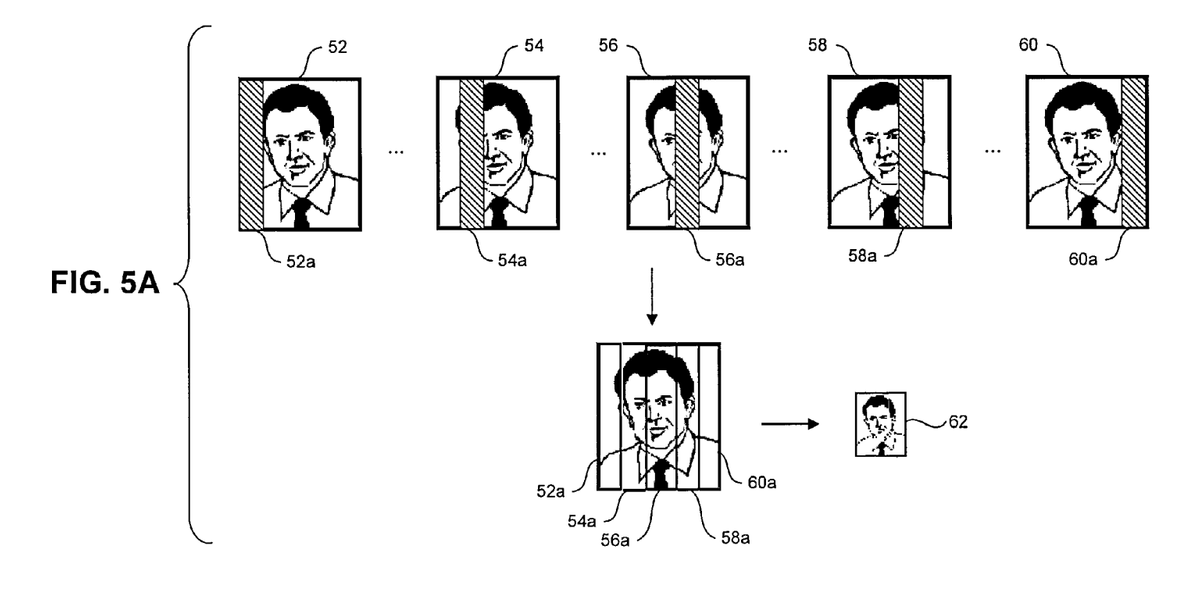
FIG. 5A is the series of frames of FIG. 4 used to create a composite image from varying columns of frame data.

As shown in FIG. 5A, the video processing circuit 13 is programmed to extract a portion of frame data 52*a*, 54*a*, 56*a*, 58*a*, 60*a* from each frame in the sequence of frames 52, 54, 56, 58, 60 as described above. The extracted portions of frame data are columns of frame data 52*a*, 54*a*, 56*a*, 58*a*, 60*a* that are extracted from varying positions in each frame 52, 54, 56, 58, 60 based upon the location of the frame within the sequence of frames. Thus, the extracted portion 52*a* from the first frame 52 in the sequence is on the left side of the frame, the extracted portion 54*a* from the second frame 54 in the sequence is located right of the first extracted portion 52*a*. The extracted portion 56*a* from the next frame 56 in the sequence is located right of the location of the second extracted portion 54*a*, etc.

The sequence of frames 52, 54, 56, 58, 60 are arranged in a chronological order. Thus, each frame 52, 54, 56, 58, 60 is representative of a different time in the chronology of the video file. As a result, the location of the extracted portion from each frame in the sequence of frames progressively shifts from left to right across the frame based upon the location of the frame within the sequence of frames, e.g., the later the frame is in the sequence of frames, the further to the right the extracted column is located. The video processing circuit 13 also may be programmed to extract columns of frame data that vary from right to left across the frames, or columns that vary both left to right and/or right to left, etc.

Regardless of how the columns vary, the video processing circuit 13 is programmed to combine the extracted columns 52*a*, 54*a*, 56*a*, 58*a*, 60*a* from each of the frames 52, 54, 56, 58, 60 to create a composite image 62. If the media file is a video file with substantially similar frames, the composite image 62 would be a rough recreation of the image from one of the frames. As shown in FIG. 5A, the video pattern thumbnail or composite image 62 is pieced together from frame data extracted from each frame in the sequence. The resulting image generally is representative of the content of the media file and may be a recognizable image, as shown by the composite image 62 in FIG. 5A. For a larger sequence of frames, this process can be repeated to create a series of thumbnails arranged side-by-side, analogous to the composite image 24 in FIG. 1.

Figure 5B:
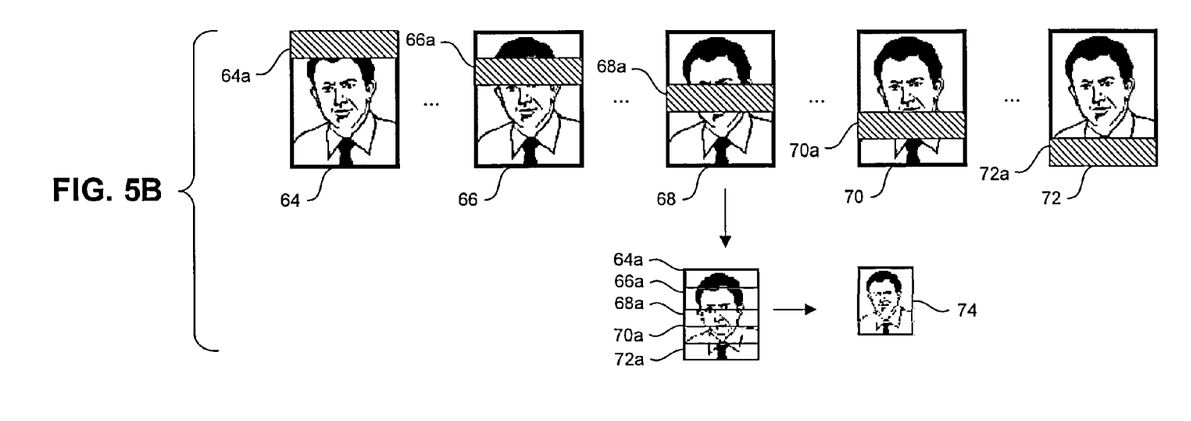
FIG. 5B is the series of frames of FIG. 4 used to create a composite image from varying rows of frame data.

In another embodiment, shown in FIG. 5B, the portions of frame data that are extracted by the video processing circuit 13 are rows of frame data 64*a*, 66*a*, 68*a*, 70*a*, 72*a* from the sequence of frames 64, 66, 68, 70, 72. The rows of frame data are extracted from varying locations within the frames. As illustrated in FIG. 5B, the rows vary from the top of the frame to the bottom of the frame based upon the location of the frame within the sequence of frames. The extracted row 64*a* from the first frame 64 in the sequence of frames is near the top of the frame. The extracted row 66*a* from the next frame 66 in the sequence of frames is below the first extracted row 64*a*, etc., for each frame in the sequence of frames. As the frames progress further through the media file, the extracted portion is progressively nearer to the bottom of the frame, until, for example, the bottom row is extracted, or the video processing circuit 13 cycles to extract rows from the top of the frames, etc.

The video processing circuit 13 is programmed to arrange the extracted rows 64*a*, 66*a*, 68*a*, 70*a*, 72*a* to form the video pattern thumbnail or composite image 74. The first extracted row 64*a* is arranged at the top of the composite image 74, the second extracted row 66*a* below the first extracted row 64*a* and so on for each row extracted from the sequence of frames. The number of rows of extracted frame data may be based upon the number of rows available for displaying the composite image. For example, if 30 rows of pixels are available for display of the composite image, then 30 rows of frame data may be extracted. For a larger sequence of frames, this process can be repeated to create a series of thumbnails arranged side-by-side, analogous to the composite image 24 in FIG. 1.

Figure 5C:
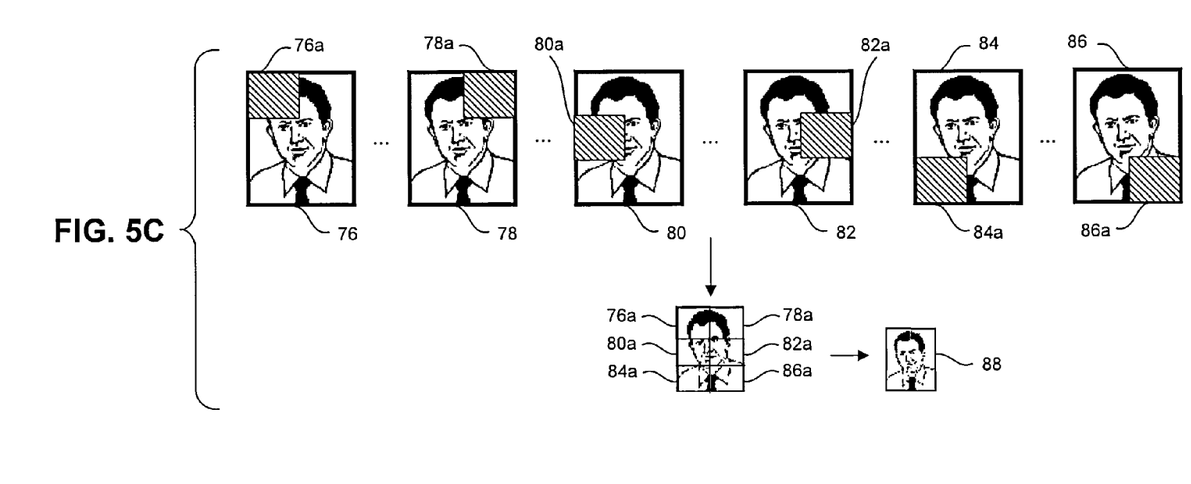
FIG. 5C is the series of frames of FIG. 4 used to create a composite image from varying portions of frame data.

In the embodiment of FIG. 5C, the video processing circuit is programmed to extract portions of frame data 76*a*, 78*a*, 80*a*, 82*a*, 84*a*, 86*a* from each of the frames 76, 78, 80, 82, 84, 86 in the sequence of frames. The blocks of frame data are extracted according to the location of the frame relative to the sequence. As illustrated, the extracted portion 76*a* from the first frame 76 of the sequence is a block from the top left corner of the frame. The extracted portion 78*a* in the next frame 78 of the sequence is a block from the top right corner of the frame. The extracted portion 80*a* from the third frame 80 in the sequence is a block located at the middle left side of the frame, etc., for each frame in the sequence, as shown in FIG. 5C.

The video processing circuit 13 is programmed to arrange the extracted portions 76*a*, 78*a*, 80*a*, 82*a*, 84*a*, 86*a* to create a composite image 88. As shown, the extracted portions are arranged to form the composite image based upon the location of the extracted data in the sequence of frames. For example, the first extracted portion 76*a* is located at the top left of the composite image, the second extracted portion 78*a* is at the top right of the composite image, etc., such that the extracted blocks 76*a*, 78*a*, 80*a*, 82*a*, 84*a*, 86*a* create a rough representation of the images from the sequence of frames 76, 78, 80, 82, 84, 86. For a larger sequence of frames, this process can be repeated to create a series of thumbnails arranged side-by-side, analogous to the composite image 24 in FIG. 1.

It will be appreciated that any size portion or block of frame data may be extracted from each frame. For example, the blocks may be one pixel by one pixel squares or may be half of the frame or larger. It will also be appreciated that the embodiment depicted in FIG. 5C is only representative of the broad concept of extracting portions or blocks of frame data from the sequence of frames, and the extracted frame data may be in the form of blocks of frame data or any other shape, such as, for example, circular shape, rectangular shape, etc.

Figure 5D:
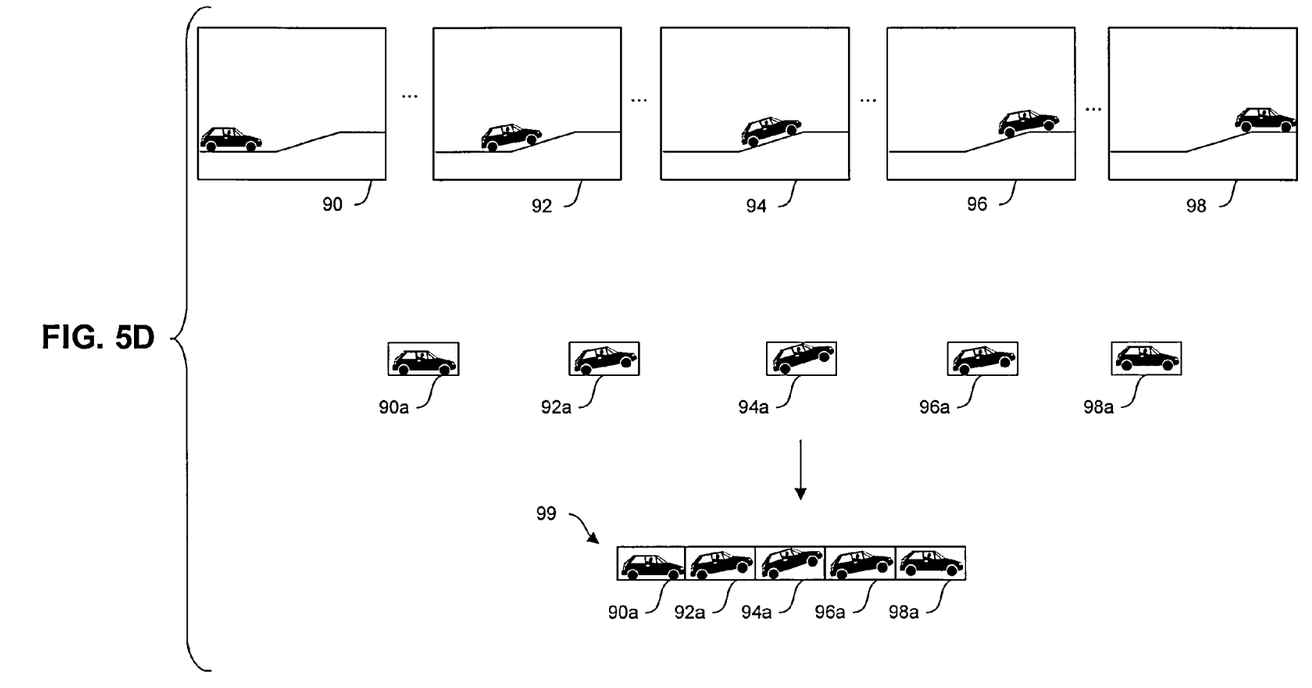
FIG. 5D is a series of frames used to create a composite image.

FIG. 5D depicts another embodiment. As shown in FIG. 5D, the sequence of frames 90, 92, 94, 96, 98 is a series of images having a generally fixed background and a focal point of action. For example, as shown in FIG. 5D, the media file may be a video of a car traveling down a road such that most of the movement in the video is the movement of the car. The video processing circuit 13 is programmed to extract the data representative of the movement in the video file. In order to determine the location of the most movement in each frame, the video processing circuit 13 is programmed to compare the data corresponding to sequential frames in the sequence of frames. For example, when the image of frame 90 is compared to the image of subsequent frame 92, the location of the greatest change in the image of frame 90 is the portion 90*a*. Thus, portion 90*a* is extracted from frame 90. The processor 13 then compares the corresponding images for frame 92 and frame 94. The location of the greatest change in frame 92 as compared to frame 94 is portion 92*a*. This process is repeated for each frame in the sequence of frames until all of the frames are processed. The extracted portions of data 90*a*, 92*a*, 94*a*, 96*a*, 98*a* are then arranged side-by-side to create the composite image 99. Further, as described above, this process may be repeated for any number of frames in the sequence to create the composite image 99. It will be appreciated that the processor 13 may be programmed to compare the data representing each corresponding images in the sequence of frames to determine the location of the greatest changes in the media file in the memory 112 (FIG. 9) without displaying each image on the display 18.

In another embodiment, the frames that comprise the sequence may be determined by the content of the media file. For example, the sequence of frames may be comprised of more frames at locations in the media file having more action or having larger changes in the corresponding images for each frame as compared to the subsequent frame. The composite image may then be formed as described in any of the above embodiments. The resulting composite image would therefore be comprised of data extracted from more frames at locations in the media file having more action or greater changes in the corresponding images and less data extracted from frames having less action or fewer changes in the corresponding images.

The composite image also may reflect the locations of greater action or more changes in the corresponding images for the frames in the media file. For example, the portions of data in the composite image that are extracted from the locations in the media file having large changes in the corresponding images or greater action may be brighter than the portions extracted from locations having less action. In addition or in the alternative, the relative height of the extracted portions may vary according to the relative amount of action in media file. For example, the relative height may be increased at those locations in the media file where there is more action and/or decreased at those locations where there is less action.

It also will be appreciated the in any of the embodiments described herein, the extracted frame data may vary based upon the location of the frame within the sequence of frames or may vary randomly, or may vary according to some other pattern or other arrangement. The composite image also may be formed by arranging the extracted portions of frame data randomly.

The varying extracted portions in each of the embodiments of FIGS. 5A-5D are sequential to one another, e.g., each extracted portion is aligned with the next extracted portion so that the extracted portions cover the entire frame. It will be appreciated that the extracted portions do not need to be sequential to one another, e.g., some portions of the frame may not be extracted by the video processing circuit or the extracted portions may be smaller than illustrated in the Figures, or the extracted portions may be spaced apart, etc. The extracted portions, however, may still be arranged in the same general manner to create a video pattern thumbnail, as described above. It also will be appreciated that although illustrated with a limited number of frames, the concepts described herein are equally applicable to a sequence of any number of frames. Further, even though the composite image has been described as being formed from a sequence of similar frames, it will be appreciated that the composite image also may be formed from a sequence of frames that are not similar or in which each frame is different, such as, for example, the media file 16 depicted in FIG. 2 and described above, or an audio file, etc.

Although the examples depicted in FIGS. 2-5D are black in white, it will be appreciated that the description herein is equally applicable to color media files. For example, a video file that begins with scenes in a jungle, followed by scenes on a beach or in an ocean and concludes with scenes in a jungle could have a video pattern thumbnail with shades of greens and browns, then blues and whites, and then greens and browns again. A movie that is generally dark and gory may have a video pattern thumbnail that is comprised of pixel data representative of dark colors and shades of red. In another example, the media file may be an audio file with the video processing circuit 13 operable to create a graphical representation of the content of the audio file, such as, for example, frame data representative of a waveform. The video processing circuit 13 would then extract the frame data from the plurality of frames representing the waveform to create the composite image, as described above.

Figure 6A:
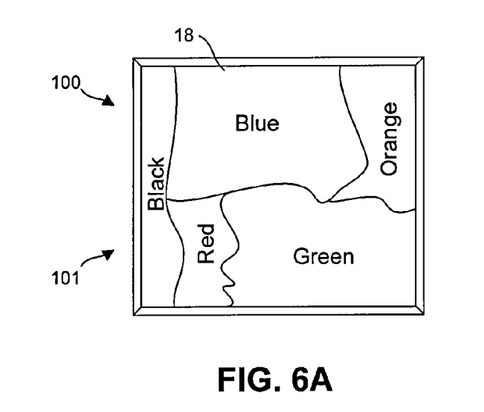
FIG. 6A is representative of a single frame from a media file.

Referring to FIG. 6A, in another embodiment, the frame data 20 comprises pixel data 22 for multiple colors displayed at the same time, as is typical of a video file or movie. The video processing circuit 13 is operable to process the frame data 20 from the plurality of frames to determine the most dominant color for each row of pixel data in the pixel array. The video processing circuit 13 is programmed to extract the pixel data 22 corresponding to the most dominant color in each row of frame data 20 to create a vertical column of pixel data. For purposes of simplification in FIG. 6A, several different colors are shown as blocks of color on the display 18. The dominant color of the top portion 100 of the display 18 is blue while the dominant color of the bottom portion 101 of the display 18 is green.

Figure 6B:
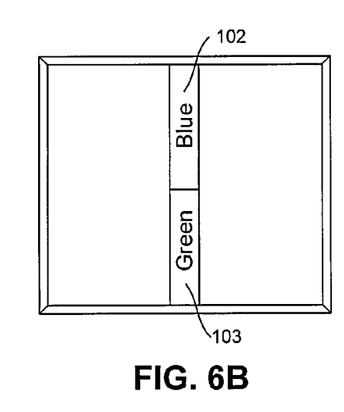
FIG. 6B is representative of an extracted portion of pixel data from the frame of FIG. 6A.

FIG. 6B is representative of the column of pixel data created by the video processing circuit 13 after determining the most dominant colors of pixel data in each row of the pixel array. The upper portion 102 of the column of pixel data is blue, while the lower portion 103 of the column of pixel data is green. The video processing circuit 13 is programmed to process each of the plurality of frames of the video file in same manner. The extracted pixel data is then arranged side-by-side in chronological order, as described above, to create a composite image representative of the content of the video or other media file.

It will be appreciated that instead of columns of pixel data, the extracted portions of pixel data may be comprised of rows of pixel data, or squares of pixel data, or random pixel data, etc. Also, instead of side-by-side chronological order, the extracted portions of pixel data may be arranged in a checkerboard pattern, randomly, or in another pattern or orientation, etc.

Figure 7:
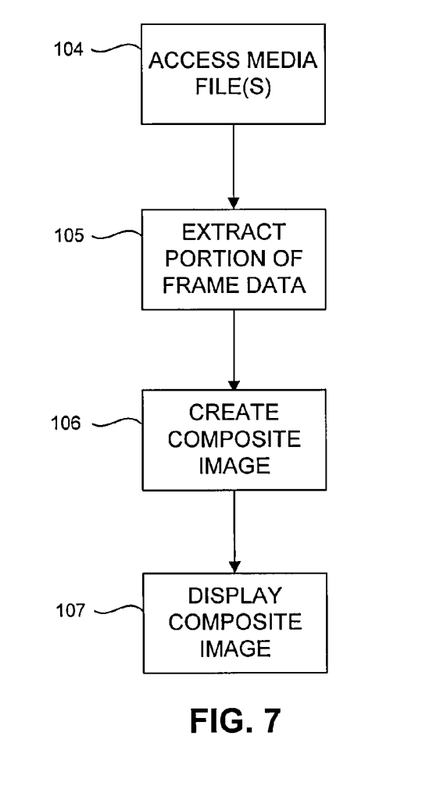
FIG. 7 is a flow chart representing the steps for processing the media file to create the composite image.

Referring now to FIG. 7, a flowchart illustrates the operation of the video processing circuit 13 as it is programmed to create the composite image. In Step 104, the video processing circuit 13 is programmed to access a media file 16 from the media library 14. The media files 16 may be stored within the memory of the mobile telephone or located remote from the mobile telephone 10 and accessed via a radio circuit 122 (FIG. 9). Each media file is comprised of a plurality of frames, each having frame data 20 comprised of an array of pixel data 22 for displaying the frame on the display 18.

In Step 105, the video processing circuit 13 is programmed to extract a portion of the frame data 20 from each of the plurality of frames in the media file 16. The plurality of frames may be determined by the total number of pixels comprising the width of the display 18. For example, if the display is 240 pixels wide, then the video processing circuit 13 would be programmed to select 240 frames from the media file 16, or one column of pixel data per pixel column on the display 18. As described above, the video processing circuit 13 also may be programmed to accommodate displays of varying size and resolution and/or video files of varying lengths. Further, the size of the extracted potions of pixel data may be dependent on such factors as the resolution of the display, the length of the media file, etc., as described above.

In the extracting step 105, the video processor 13 also may be programmed to extract portions of frame data that correspond to the most movement in each frame as compared to a subsequent frame in the sequence of frames. The video processor 13 may be programmed to determine the location of the most movement by comparing two adjacent frames and determining the location of the most movement, then extract only that portion of the frame for creating the composite image. The video processor 13 also may be programmed to extract data from a larger number of frames at locations in the media file having more action and fewer portions of data at those locations in the media file having less action.

In Step 105, the video processing circuit 13 is programmed to extract a portion of the pixel data 22 from each of the plurality of frames in Step 104. In one embodiment, the extracted pixel data is comprised of columns of pixel data as described above. In other embodiments, the extracted pixel data may be comprised of rows of pixel data, squares of pixel data, etc., or any other variation that may be likely to be representative the relevant content of the frame data 20 for the selected frame. For example, the extracted portions of data may be varying columns, rows, blocks or other portions of frame data, as described above.

Referring to Step 106, the video processing circuit 13 is programmed to arrange the extracted pixel data to create the composite image. The columns of extracted pixel data are arranged side-by-side in chronological order to create a composite image that is representative of the content of the media file 16. The extracted pixel data also may be arranged in different orientations, such as a horizontal line, or a checkerboard pattern, or randomly, etc. The video processor 13 also may be programmed to reduce the size of the composite image, or to vertically compress the composite image to create a smaller or reduced-size composite image.

In other embodiments, the video processing circuit 13 is programmed to arrange the varying extracted portions of frame data based upon the location of the frames within the sequence of frames. For example, if the varying columns of frame data are extracted, the video processing circuit 13 may be programmed to arrange the columns based upon the location of the frame from which the data was extracted within the sequence of frames. Similarly, if rows of frame data are extracted, they are arranged from top to bottom and/or may be arranged in sets of extracted data from left to right, such that every time the video processing circuit 13 extracts a row from the top of the frame, a new set is created. Likewise, if blocks or other portions of frame data are extracted, they may be arranged in the same manner, e.g., according to the location within the sequence of frames.

The video processor also may brighten those portions of extracted data that correspond to locations in the media file that have more action or decrease the brightness of those extracted portions that correspond to locations in the media file having less action. Additionally or alternatively, the video processor 13 may increase or decrease the relative height of the extracted portions in the composite image based upon the relative level of action in the video file at the locations from which the data is extracted. Thus, at locations corresponding to portions of the media file having more action, the relative height of the composite image may be higher than the portions corresponding to those locations in the video file having less action.

In Step 107, the video processing circuit 13 is programmed to display the composite image on the electronic equipment as part of a menu for displaying the contents of the media library 14. The display 18 may include the composite image, the name of the media file, the progress bar, etc., such that a user can easily discern the content of the media file by looking at the composite image and/or other information contained in the menu and shown on the display 18.

Figure 8:
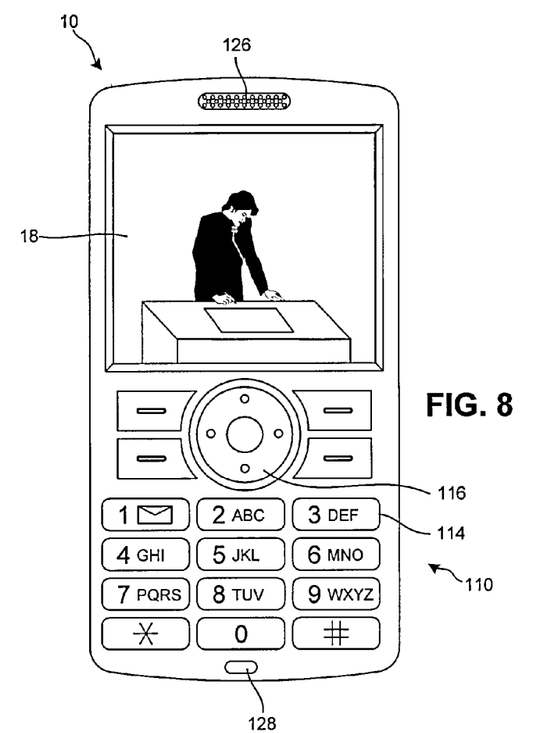
FIG. 8 is a an exemplary embodiment of a mobile telephone.

Referring to FIG. 8, the mobile telephone 10 also includes a display 18 and keypad 110. As is conventional, the display 18 displays information to a user such as operating state, time, telephone numbers, contact information, various navigational menus, etc., which enable the user to utilize the various features of the mobile telephone 10. The display 18 is also used to visually display content received by the mobile telephone 10 and/or retrieved from a memory 112 of the mobile telephone 10. In addition, a phone number or a text message entered by the user may be displayed on the display 18 as part of a graphical user interface (GUI).

The keypad 110 may be conventional in that it provides for a variety of user input operations. For example, the keypad 110 typically includes alphanumeric keys 114 for allowing entry of alphanumeric information such as telephone numbers, phone lists, contact information, notes, etc. In addition, the keypad 110 may include special function keys such as a "call send" key for initiating or answering a call, and a "call end" key for ending, hanging up, or disconnecting a phone call.

The keypad 110 also may contain special function keys, which may include menu navigation keys 116, for example, for navigating through a menu displayed on the display 18, such as the media library 14, contact list, etc., or to select different telephone functions, profiles, settings, etc., as is conventional. Other keys associated with the mobile telephone 10 may include a volume key, an audio mute key, an on/off power key, a web browser launch key, a camera key, etc. Keys or key-like functionality also may be embodied as a touch screen associated with the display 18. The keys 114 may be used to enter written text (e.g., a string of alphanumeric characters) and to operate GUI menus, or to adjust or modify the mobile telephone settings, such as, for example, the brightness of the display, audio volume, etc.

The mobile telephone 10 includes conventional call circuitry that enables the mobile telephone 10 to establish a call and/or exchange signals with a called/calling device, typically another mobile telephone or landline telephone. The called/calling device need not be another telephone, however, it may be some other device such as an Internet web server, a content providing server, etc.

FIG. 9 represents a functional block diagram of the mobile telephone 10. For the sake of brevity, generally conventional features of the mobile telephone 10 will not be described in great detail. The mobile telephone 10 includes a primary control circuit 12 that is configured to carry out overall control of the functions and operations of the mobile telephone 10. The control circuit 12 may include a processing device 118, such as a CPU, microcontroller or microprocessor. The processing device 118 executes code stored in a memory (not shown) within the control circuit 12 and/or in a separate memory, such as memory 112, in order to carry out operation of the mobile telephone 10. The memory 112 may be, for example, one or more of a buffer, a flash memory, a hard drive, a removable media, a volatile memory, a non-volatile memory or other suitable device.

It will be apparent to a person having ordinary skill in the art of computer programming, and specifically in applications programming for mobile telephones or other electronic devices, how to program a video processing circuit 13 and the mobile telephone 10 to operate and carry out the functions described herein.

Continuing to refer to FIGS. 8 and 9, the mobile telephone 10 includes an antenna 120 coupled to a radio circuit 122. The radio circuit 122 includes a radio frequency transmitter and receiver for transmitting and receiving signals via the antenna 120 as is conventional. The radio circuit 122 may be configured to operate in a mobile communications system, as well as to receive data and/or audiovisual content or radio transmissions. For example, the receiver may be an IP datacast compatible receiver compatible with a hybrid network structure providing mobile communications and digital broadcast services, such as DVB-H mobile television and/or mobile radio. Other receivers for interaction with a mobile radio network or broadcasting network are possible and include, for example, GSM, CDMA, WCDMA, MBMS, WiFi, WiMax, DVB-H, ISDB-T, etc., as well as advanced versions of these protocols.

The mobile telephone 10 further includes a sound processing circuit 124 for processing audio signals transmitted by/received from the radio circuit 122. Coupled to the sound processing circuit 124 is a speaker(s) 126. Also coupled to the sound processing circuit 124 is a microphone 128 that enables a user to speak via the mobile telephone 10 as is conventional. The radio circuit 122 and sound processing circuit 124 are each coupled to the control circuit 12 so as to carry out overall operation. Audio data may be passed from the control circuit 12 to the sound processing circuit 124 for playback to the user via the speaker 126. The audio data may include, for example, audio data from an audio file stored by the memory 112 and retrieved by the control circuit 12, or an audio file or other media file remotely stored from the mobile telephone 10 and accessed or received by the radio circuit 122 or another conventional means. The sound processing circuit 124 may include any appropriate buffers, decoders, amplifiers, and so forth.

The mobile telephone 10 also includes the aforementioned display 18 and keypad 110 coupled to the control circuit 12. The display 18 may be coupled to the control circuit 12 by a video processing circuit 13 that converts video data to a video signal used to drive the display 18. The video data may be generated by the control circuit 12, retrieved from a video file that is stored in the memory 112, derived from an incoming video data stream received by the radio circuit 122 or obtained by any other suitable method.

The mobile telephone 10 further includes one or more I/O interface(s) 130. The I/O interface(s) 130 may be in the form of typical mobile telephone I/O interfaces and may include one or more electrical connectors. As is typical, the I/O interface(s) 130 may be used to couple the mobile telephone 10 to a battery charger to charge a battery of a power supply unit (PSU) 132 within the mobile telephone 10. In addition, or in the alternative, the I/O interface(s) 130 may serve to connect the mobile telephone 10 to a wired personal hands-free adaptor (not shown), such as a headset to audibly output sound signals output by the sound processing circuit 124 to the user. Further, the I/O interface(s) 130 may serve to connect the mobile telephone 10 to a personal computer or other device via a data cable. The mobile telephone 10 may receive operating power via the I/O interface(s) 130 when connected to a vehicle power adapter or an electricity outlet power adapter.

The mobile telephone 10 also may include a timer 134 for carrying out timing functions. Such functions may include timing the durations of calls, generating the content of time and date stamps, etc. The mobile telephone 10 may include a camera 136 for taking digital pictures and/or movies. Image and/or video files corresponding to the pictures and/or movies may be stored in the memory 112. The mobile telephone 10 also may include a position data receiver 138, such as a global positioning system (GPS) receiver, Galileo satellite system receiver or the like. The mobile telephone 10 also may include a local wireless interface 140, such as an infrared transceiver and/or an RF adaptor (e.g., a Bluetooth adapter), for establishing communication with an accessory, a hands-free adaptor (e.g., a headset that may audibly output sounds corresponding to audio data transferred from the mobile telephone 10 to the adapter), another mobile radio terminal, a computer or another device.

The mobile telephone 10 may be configured to transmit, receive and process data, such as text messages (e.g., colloquially referred to by some as "an SMS"), electronic mail messages, multimedia messages (e.g., colloquially referred to by some as "an MMS"), image files, video files, audio files, ring tones, streaming audio, streaming video, data feeds (including podcasts) and so forth. Processing such data may include storing the data in the memory 112, executing applications to allow user interaction with data, displaying video and/or image content associated with the data, outputting audio sounds associated with the data and so forth.

The control circuit 12 may be configured to access a media library 14. The media library 14 may access one or more media files 16 stored within the memory 112 or located remote from the mobile telephone 10 and accessed via the radio circuit 122, or another suitable means, as will be appreciated by one in the art. The media files 16 may be any type of audio/visual file, for example including, but not limited to, .avi, .mpeg, .mpeg-2 .mp3, .mp4, .midi, .jpg, .jpeg, .ppt, streaming video, etc. The sound processing circuit 124 may operate to process the content of the audio files into an audible signal that can be played through the speaker 126. Likewise, the video processing circuit 13 may operate to process the image or video files to produce images or video on the display 18. Both the sound processing circuit 124 and the video processing circuit 13 may be used at the same time for reproducing media files that contain both audio and video coding. The sound and video processing may be performed by any conventional processing circuit or device or may be combined into a single processor, as will be appreciated by one of skill in the art.

Figure 10:
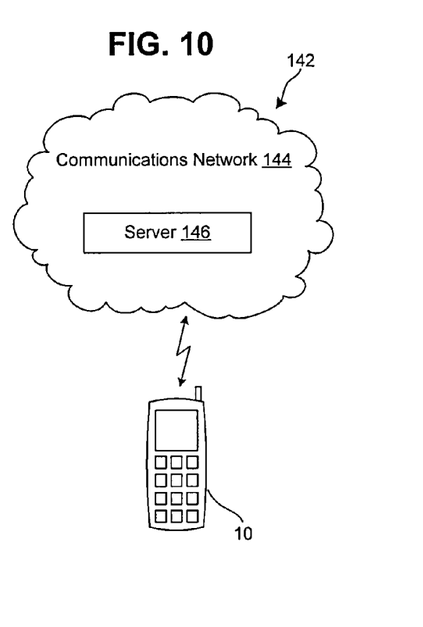
FIG. 10 is a schematic diagram of a communications system in which the mobile telephone of FIG. 8 may operate.

With additional reference to FIG. 10, the mobile telephone 10 may be configured to operate as part of a communications system 142. The system 142 may include a communications network 144 having a server 146 (or servers) for managing calls placed by and destined to the mobile telephone 10, transmitting data to the mobile telephone 10 and carrying out any other support functions. The server 146 communicates with the mobile telephone 10 via a transmission medium. The transmission medium may be any appropriate device or assembly, including, for example, a communications tower, another mobile telephone, a wireless access point, a wired access point, a satellite, etc. Portions of the network may include wireless transmission pathways. The network 144 may support the communications activity of multiple mobile telephones 10, although only one mobile telephone 10 is shown in the illustration of FIG. 10.

In one embodiment, the server 146 may operate in stand alone configuration relative to other servers of the communications network 144 or may be configured to carry out multiple communications network functions. As will be appreciated, the server 146 may be configured as a typical computer system used to carry out server functions and may include a processor configured to execute software containing logical instructions that embody the functions of the server 146.

Although described primarily with respect to frame-based media files (e.g., an mpeg file), it will be appreciated that the concepts described herein are equally applicable to time-based media files, such as, for example, scalable vector graphics or SVG files, etc. For example, rather than extracting portions of specific frames in a sequence of frames, the video processor can be programmed to extract data corresponding to different timestamps. The data at each timestamp then can be used to create a sequence of frames at arbitrary times throughout the file. The video processor 13 then may extract the data at the representative timestamps to create the composite image, as described above.

Although described with respect to an electronic equipment, it will also be appreciated that the composite image and any associated video processing may be accomplished remote from the electronic equipment, for example, with a stand-alone computer, server, etc., and such composite image may be transferred to the electronic equipment in the information contained within the media file or via separate communication mechanism. The term "video pattern thumbnail" may also be used interchangeably with the term "composite image."

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. An electronic equipment comprising:
   a control circuit having access to a media file, the media file comprising as content data for a sequence of frames wherein the data for each frame in the sequence of frames represents a corresponding image, each frame in the sequence of frames having a location in the media file relative to the other frames in the sequence of frames;

a processor for:
  extracting portions of data for each frame in the sequence of frames, the location of the portion extracted from each given frame varying among respective frames in the sequence of frames based upon the location of the given frame within the sequence of frames; and
  assembling the extracted portions of data to produce a composite image representative of the content of the media file.

2. The electronic equipment of claim 1 wherein the composite image is comprised of the extracted portions of data arranged in a chronological order according to the location of the given frame within the sequence of frames.

3. The electronic equipment of claim 1 wherein the extracted portions are comprised only of columns of frame data.

4. The electronic equipment of claim 3 wherein the data representing the composite image is comprised of the columns of frame data arranged in a chronological order according to the location of the given frame within the sequence of frames.

5. The electronic equipment of claim 1 wherein the extracted portions are comprised only of rows of frame data.

6. The electronic equipment of claim 5 wherein the data representing the composite image is comprised of the rows of frame data arranged according to the location of the given frame within the sequence of frames.

7. The electronic equipment of claim 1 wherein the portions extracted from each frame in the sequence of frames varies based upon the location of the greatest changes in the corresponding images for sequential frames within the sequence of frames.

8. The electronic equipment of claim 1 wherein the sequence of frames is comprised of more frames at locations in the media file where there are large changes in the corresponding images for sequential frames in the media file and fewer frames at locations in the media file where there are small data changes in the corresponding images for sequential frames in the media file.

9. The electronic equipment of claim 8 wherein in the composite image, the portions of data extracted from the frames in the media file corresponding to large changes are brighter than the portions of data extracted from the frames in the media file corresponding to small changes.

10. The electronic equipment of claim 1 wherein the media file is frame-based media.

11. The electronic equipment of claim 1 wherein the media file is time-based media.

12. A method of creating an image with an electronic equipment comprising the steps of:
  accessing a media file, the media file comprising as content data for a sequence of frames wherein the data for each frame in the sequence of frames represents a corresponding image, each frame in the sequence of frames having a location in the media file relative to the other frames in the sequence of frames;
  extracting portions of data from the frames in the sequence of frames, the location of the extracted portion varying among respective frames in the sequence of frames based upon the location of the given frame within the sequence of frames; and
  assembling the extracted portions of data to produce a composite image representative of the content of the media file.

13. The method of claim 12 further comprising the step of forming a composite image by arranging the extracted portions in a chronological order according to the location of the given frame within the sequence of frames.

14. The method of claim 12 wherein the extracting step comprises extracting only columns of frame data.

15. The method of claim 14 further comprising the step of arranging the columns of frame data in a chronological order according to the location of the given frame within the sequence of frames.

16. The method of claim 12 wherein the extracting step comprises extracting only rows of frame data.

17. The method of claim 16, further comprising the step of arranging the varying rows of frame data according to the location of the given frame within the sequence of frames.

18. The method of claim 12 wherein extracting portions of data from the frames in the sequence of frames comprises extracting data from more frames at locations in the media file where there are large changes in the corresponding images for sequential frames in the media file and from less frames at locations in the media file where there are small changes in the corresponding image for sequential frames in the media file.

19. The method of claim 18 further comprising the step of brightening those portions of the composite image formed from portions of data extracted from the locations in the media file having large changes in the corresponding images for sequential frames in the media file.

20. A program stored on a machine readable medium which, when executed by a machine, provides for the creation of an image by:
  accessing a media file, the media file comprising as content frame data for a sequence of frames, wherein each frame in the sequence of frames has a location in the media file relative to the other frames in the sequence of frames;
  extracting varying portions of the frame data from each of the frames in the sequence of frames the location of the extracted portion varying among respective frames in the sequence of frames based upon the location of the given frame within the sequence of frames; and
  assembling the extracted portions to produce a composite image representative of the content of the media file, the composite image comprised of the extracted portions of frame data from the frames in the sequence of frames.

* * * * *